United States Patent
Oh

(10) Patent No.: US 11,774,411 B2
(45) Date of Patent: Oct. 3, 2023

(54) JIG FOR SUPPLYING ULTRASONIC MEDIUM AND APPARATUS FOR FAST SCANNING WITH CIRCULATING ULTRASONIC MEDIUM

(71) Applicant: Pukyong National University Industry-University Cooperation Foundation, Busan (KR)

(72) Inventor: Junghwan Oh, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 99 days.

(21) Appl. No.: 17/198,964

(22) Filed: Mar. 11, 2021

(65) Prior Publication Data
US 2021/0293759 A1 Sep. 23, 2021

(30) Foreign Application Priority Data
Mar. 17, 2020 (KR) .................. 10-2020-0032552

(51) Int. Cl.
*G01N 29/28* (2006.01)
*G01N 29/06* (2006.01)
*G01N 29/265* (2006.01)

(52) U.S. Cl.
CPC ......... *G01N 29/28* (2013.01); *G01N 29/0654* (2013.01); *G01N 29/265* (2013.01)

(58) Field of Classification Search
CPC .. G01N 29/28; G01N 29/0654; G01N 29/265; G01N 29/043; G01N 29/225; G01N 29/221; G01N 29/2487
See application file for complete search history.

(56) References Cited

U.S. PATENT DOCUMENTS

2003/0115961 A1* 6/2003 Hawbaker .............. G01N 29/27
73/588
2014/0283612 A1* 9/2014 Williams .............. G01N 29/043
73/633
(Continued)

FOREIGN PATENT DOCUMENTS

KR 20-0284334 3/2003
KR 10-0923313 10/2009
(Continued)

*Primary Examiner* — Xin Y Zhong
(74) *Attorney, Agent, or Firm* — Faegre Drinker Biddle & Reath LLP

(57) ABSTRACT

Disclosed are an ultrasonic medium supplying jig and a fast ultrasonic scanning apparatus with a circulating medium, in which the medium is continuously supplied to between an ultrasonic probe and a to-be-scanned object to prevent the to-be-scanned object from being submerged in water, thereby enabling a stable ultrasound image to be obtained while achieving fast scanning. The disclosed ultrasonic medium supplying jig may include jig for supplying an ultrasonic medium, the medium supplying jig including: a main body having a space provided to open at least one surface thereof to form a receiving part in which one end including a sensing surface of an ultrasonic probe is received; a medium inlet port through which the ultrasonic medium is injected; a first medium outlet port provided at a position of the main body, where a sensing surface of the ultrasonic probe is disposed, to supply the ultrasonic medium; and a medium supply line provided to transfer the ultrasonic medium by connecting the medium inlet port with the first medium outlet port; and a second medium outlet port being in communication with the medium supply line and formed on the outer surface of the main body while penetrating a bottom surface of the main body from the first medium outlet port.

18 Claims, 10 Drawing Sheets

(56) References Cited

U.S. PATENT DOCUMENTS

2018/0340914 A1* 11/2018 Lim ........................ G01N 29/11
2019/0242728 A1*  8/2019 Low ..................... B25J 15/0019
2021/0396717 A1* 12/2021 Fiseni ................ G01N 29/2475

FOREIGN PATENT DOCUMENTS

| KR | 10-2011-0125744 | 11/2011 |
| KR | 10-1377448 | 3/2014 |
| KR | 10-1739030 | 5/2017 |
| KR | 10-2029432 | 10/2019 |
| WO | 2020/053554 | 3/2020 |

* cited by examiner

JIG FOR SUPPLYING ULTRASONIC MEDIUM AND APPARATUS FOR FAST SCANNING WITH CIRCULATING ULTRASONIC MEDIUM

CROSS-REFERENCE TO RELATED APPLICATION

This application claims the benefit of Korean Patent Application No. 10-2020-0032552, filed on Mar. 17, 2020, in the Korean Intellectual Property Office, the disclosure of which is incorporated herein in its entirety by reference.

BACKGROUND

1. Field

The present disclosure relates to a fast ultrasonic scanning apparatus, and more particularly, to a jig for supplying an ultrasonic medium and an apparatus for fast scanning with a circulating ultrasonic medium, in which a stable ultrasound image can be obtained while achieving fast scanning.

2. Description of the Related Art

An ultrasonic system is one of important diagnosis systems currently being applied in various fields. Particularly, an ultrasonic system has non-invasive and non-destructive characteristics with respect to a to-be-scanned object, and thus is widely used in various fields. In recent years, ultrasonic systems are used in generating a two-dimensional or three-dimensional image of the internal shape of the to-be-scanned object.

The ultrasonic system includes an ultrasonic probe including a broadband transducer for transmitting and receiving an ultrasonic signal. When the transducer is electrically stimulated, an ultrasonic signal is generated and transmitted to the to-be-scanned object. The ultrasonic signal transmitted to the to-be-scanned object is reflected and converted into an electrical signal in the transducer. The converted electrical signal is amplified and signal-processed, thereby generating ultrasonic image data for an image of a tissue.

When an ultrasonic sensor is made to contact the to-be-scanned object, the ultrasonic probe and the to-be-scanned object are closely adhered to each other to transfer ultrasonic waves generated in the device to the inside of the to-be-scanned object. However, it is not practically easy to make the sensor to be perfectly closely adhered to the to-be-scanned object.

Therefore, in a state in which a liquid medium, e.g., water, is placed in a water tank, the to-be-scanned object is immersed in water, and an end of the probe is then immersed in water, while moving over the to-be-scanned object, the ultrasonic system may be used to obtain an ultrasonic image of the to-be-scanned object.

However, for fast scanning, when a probe performs a translating motion at a high speed, severe water splashing may occur at opposite ends. In such a case, it may be difficult to obtain an accurate ultrasonic image at the opposite ends.

Meanwhile, as an example conventional ultrasonic system, a water circulation device of a jig for ultrasonic scanning is proposed in Korean Patent Registration Utility No. 20-0284334 (referred to as "prior art document," hereinafter). In the prior art document, proposed is a water circulating device of a jig for ultrasonic scanning for performing automatic scanning using water as a contact medium, and a technique for supplying water to a pump in the device and recovering used water is disclosed. In the disclosed technique, while sealing is achieved by means of a sealing member, water is supplied into a gap spaced apart from a bottom surface of a main body of the medium supplying jig, circulated and recovered. However, the proposed structure is not suitable in obtaining an ultrasonic image by fast scanning while a probe performs fast translation.

SUMMARY

The present disclosure has been made in view of the above-described problems, and an object of the present disclosure is to provide an ultrasonic medium supplying jig and a fast ultrasonic scanning apparatus with a circulating medium, in which a stable ultrasonic image can be obtained while performing fast scanning.

According to embodiments of the present disclosure, provided is a jig for supplying an ultrasonic medium, the medium supplying jig including: a main body having a space provided to open at least one surface thereof to form a receiving part in which one end (a sensing surface) of an ultrasonic probe is received; a medium inlet port through which the ultrasonic medium is injected; a first medium outlet port provided at a position of the main body, where a sensing surface of the ultrasonic probe is disposed, to supply the ultrasonic medium; and a medium supply line provided to transfer the ultrasonic medium by connecting the medium inlet port with the first medium outlet port; and a second medium outlet port being in communication with the medium supply line and formed on the outer surface of the main body while penetrating a bottom surface of the main body from the first medium outlet port.

The medium inlet port may be provided at one side of the main body, and the medium supply line may be provided inside the main body.

A space may be provided in the receiving part, so that the ultrasonic probe performs a translating motion on the first medium outlet port in a direction perpendicular to the longitudinal direction of the ultrasonic probe The medium supplying jig may further include a third medium outlet port through which the ultrasonic medium stored in the receiving part is discharged as at least a portion of one surface of the receiving part is opened.

The third medium outlet port may be formed such that at least a portion thereof is opened in one of both directions in which the ultrasonic probe performs a translating motion in the receiving part.

The first medium outlet port may be shaped of a slot in which a length thereof is larger in the direction in which the ultrasonic probe performs a translating motion than in the direction perpendicular to the translating motion.

The second medium outlet port may be shaped of a slot in which a length thereof is larger in the direction in which the ultrasonic probe performs a translating motion than in the direction perpendicular to the translating motion.

An area of a surface of the first medium outlet port, facing the ultrasonic probe, may be larger than that of a surface of the second medium outlet port, facing the ultrasonic probe.

Cross-sectional areas of the medium inlet port and the medium supply line may be smaller than those of the first medium outlet port and the second medium outlet port, respectively.

According to an aspect, a fast ultrasonic scanning apparatus with a circulating medium according to the present disclosure may comprise: a support die on which a to-be-scanned object is placed; the medium supplying jig disposed on the to-be-scanned object; and an ultrasonic probe which receives an ultrasonic image while performing a translating motion in one direction, wherein the ultrasonic probe receives the ultrasonic image while the medium supplying jig is transferred in a different direction from the longitudinal direction of the ultrasonic probe and the direction in which the ultrasonic probe performs the translating motion.

A gap having a predetermined distance may be formed between the first medium outlet port and a bottom surface of the ultrasonic probe.

A gap having a predetermined distance may be formed between the to-be-scanned object and the ultrasonic medium supplying jig.

A surface of the first medium outlet port, facing the ultrasonic probe, may be covered by a sensing surface of the ultrasonic probe at opposite ends of the translating motion of the ultrasonic probe.

The fast ultrasonic scanning apparatus may further include a medium tank for receiving the support die and storing the ultrasonic medium introduced from the ultrasonic medium supplying jig.

A fast ultrasonic scanning system with a circulating medium according to the present disclosure may control a plurality of fast ultrasonic scanning apparatuses to scan edge portions of a to-be-scanned object.

The to-be-scanned object may have a quadrangular plane shape, the ultrasonic probes may be arranged on each side of the to-be-scanned object and the respective ultrasonic probes may be controlled to simultaneously scan the respective edge portions of the to-be-scanned object while being simultaneously transferred to the respective sides of the to-be-scanned object.

The respective ultrasonic probes may simultaneously start scanning and simultaneously terminate scanning.

The to-be-scanned object may have a rectangular plane shape, and more ultrasonic probes may be arranged on longer sides than on the shorter sides of the to-be-scanned object.

As described above, in the ultrasonic medium supplying jig and the fast ultrasonic scanning apparatus, according to the present disclosure, an ultrasonic medium is continuously supplied to between an ultrasonic probe and a to-be-scanned object, thereby preventing the to-be-scanned object from being submerged in water. Accordingly, the present disclosure enables a stable ultrasound image to be obtained while achieving fast scanning.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, example embodiments of the present disclosure will be described in detail with reference with the accompanying drawings.

The terms used in the present disclosure are terms defined in consideration of functions in the present disclosure, and may vary according to intentions or customs of users or operators, and thus definitions of these terms should be interpreted in the meanings and concepts congruent with technical features of the present disclosure.

In addition, the following embodiments of the present disclosure are not intended to limit the scope of the present disclosure but merely illustrative of the components set forth in claims, which are included in the technical spirit throughout the specification of the present disclosure and include a replaceable component as an equivalent in components of claims. In addition, descriptions of components used in one embodiment of the present disclosure may also be applied to those used in other embodiments.

In addition, an optional term in the following embodiments is used to distinguish one element from another element, and the element is not limited by the following terms.

Meanwhile, in describing the present disclosure, detailed descriptions of related known techniques that may unnecessarily obscure the subject matter of the present disclosure will be omitted.

Figure 1:
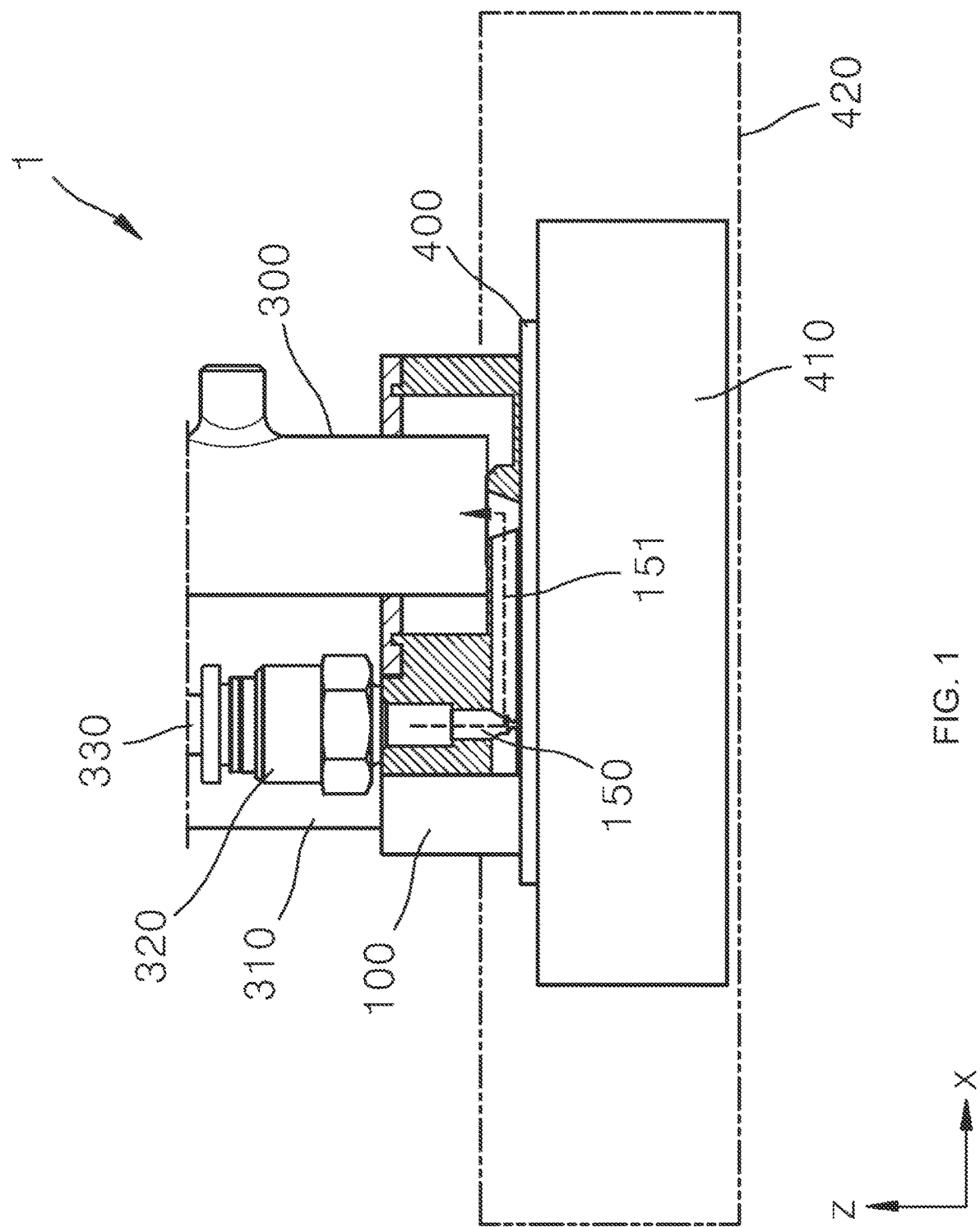
FIG. 1 is a view showing an overall configuration of a fast ultrasonic scanning apparatus with a circulating medium according to an embodiment of the present disclosure.
Figure 2:
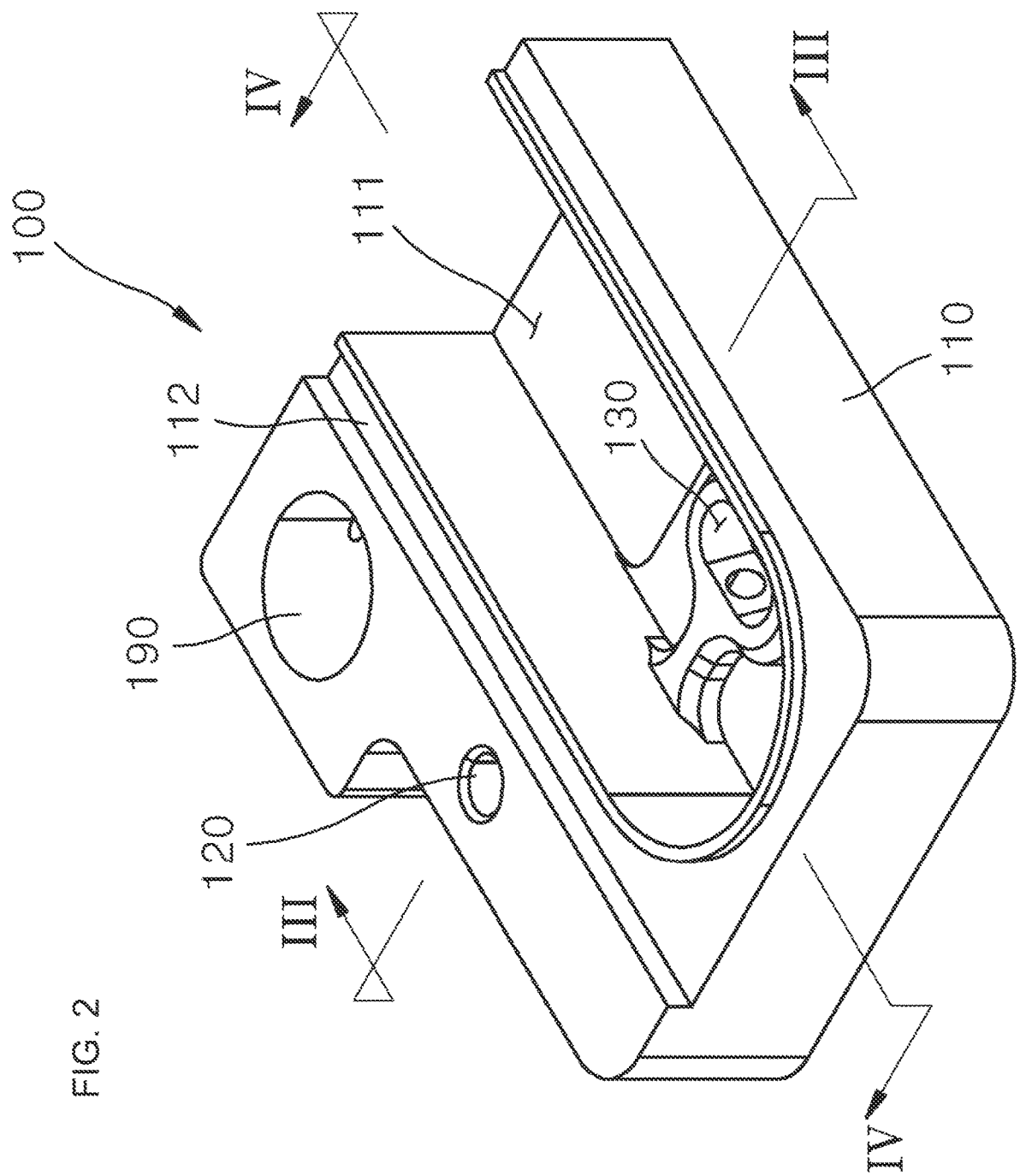
FIG. 2 is a perspective view schematically showing a medium supplying jig in the fast ultrasonic scanning apparatus of FIG. 1.
Figure 3:
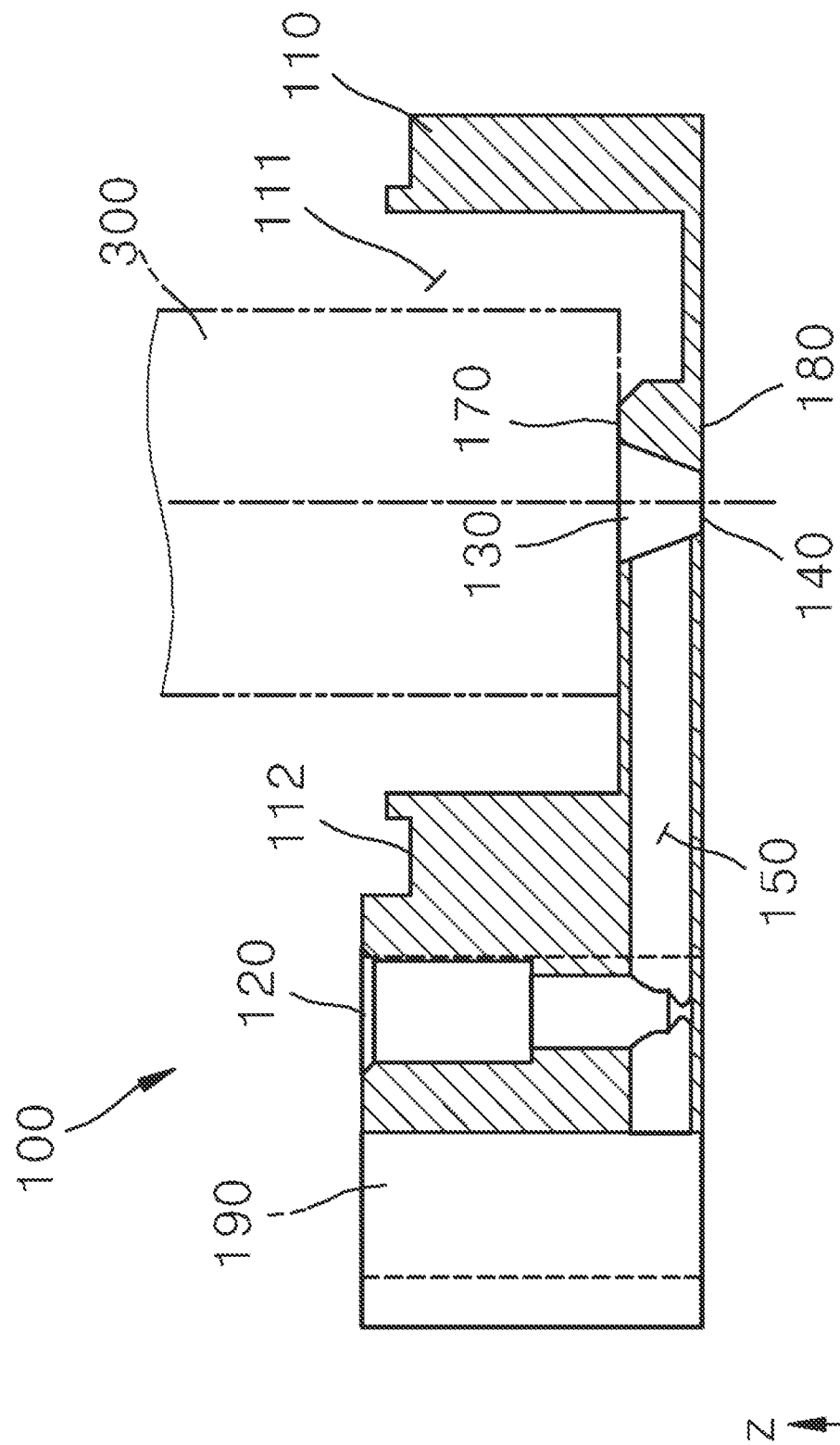
FIG. 3 is a schematic cross-sectional view taken along the line III-III in the medium supplying jig of FIG. 2.
Figure 4:
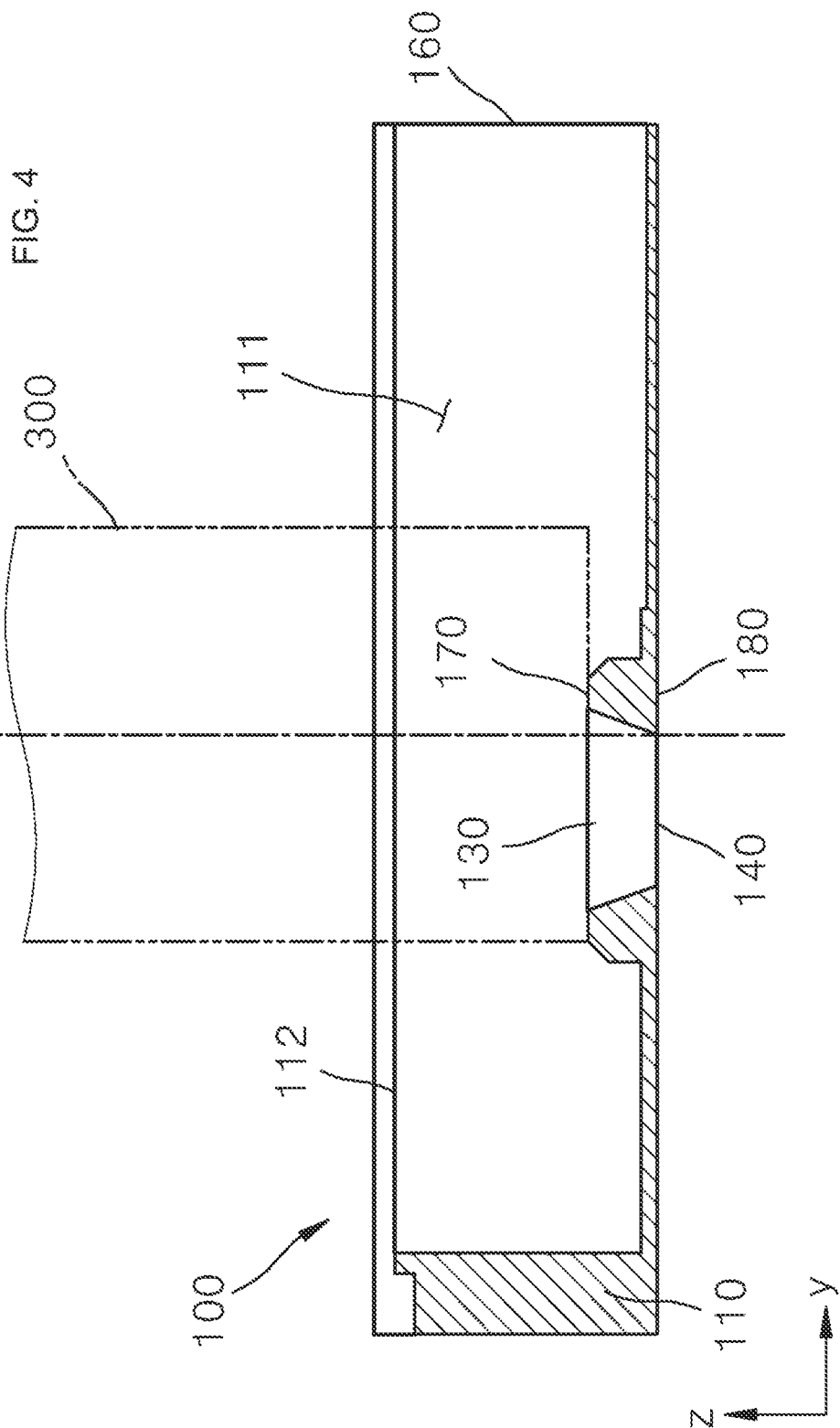
FIG. 4 is a schematic cross-sectional view taken along the line IV-IV in the medium supplying jig of FIG. 2.

FIG. 1 is a view showing an overall configuration of a fast ultrasonic scanning apparatus 1 with a circulating medium according to an embodiment of the present disclosure. FIG. 2 is a perspective view schematically showing a medium supplying jig 100 in the fast ultrasonic scanning apparatus 1 of FIG. 1, FIG. 3 is a schematic cross-sectional view taken along the line III-III in the medium supplying jig 100 of FIG. 2, and FIG. 4 is a schematic cross-sectional view taken along the line IV-IV in the medium supplying jig 100 of FIG. 2.

The fast ultrasonic scanning apparatus 1 according to an embodiment continuously supplies an ultrasonic medium to between the ultrasonic probe 300 and the to-be-scanned object 400 using the ultrasonic medium supplying jig 100.

Like in a conventional case, when the ultrasonic probe performs a translating motion at a high speed for fast scanning in a state in which the overall to-be-scanned object is submerged in water, severe water splashing may occur at both ends, making it difficult to obtain an accurate ultrasonic image at the opposite ends. However, in the fast ultrasonic scanning apparatus 1 according to an embodiment, the ultrasonic image is obtained by continuously supplying water to between an ultrasonic probe and the to-be-scanned object while preventing the to-be-scanned object from being submerged in water, thereby obtaining a stable ultrasonic image while performing fast scanning.

Figure 8:
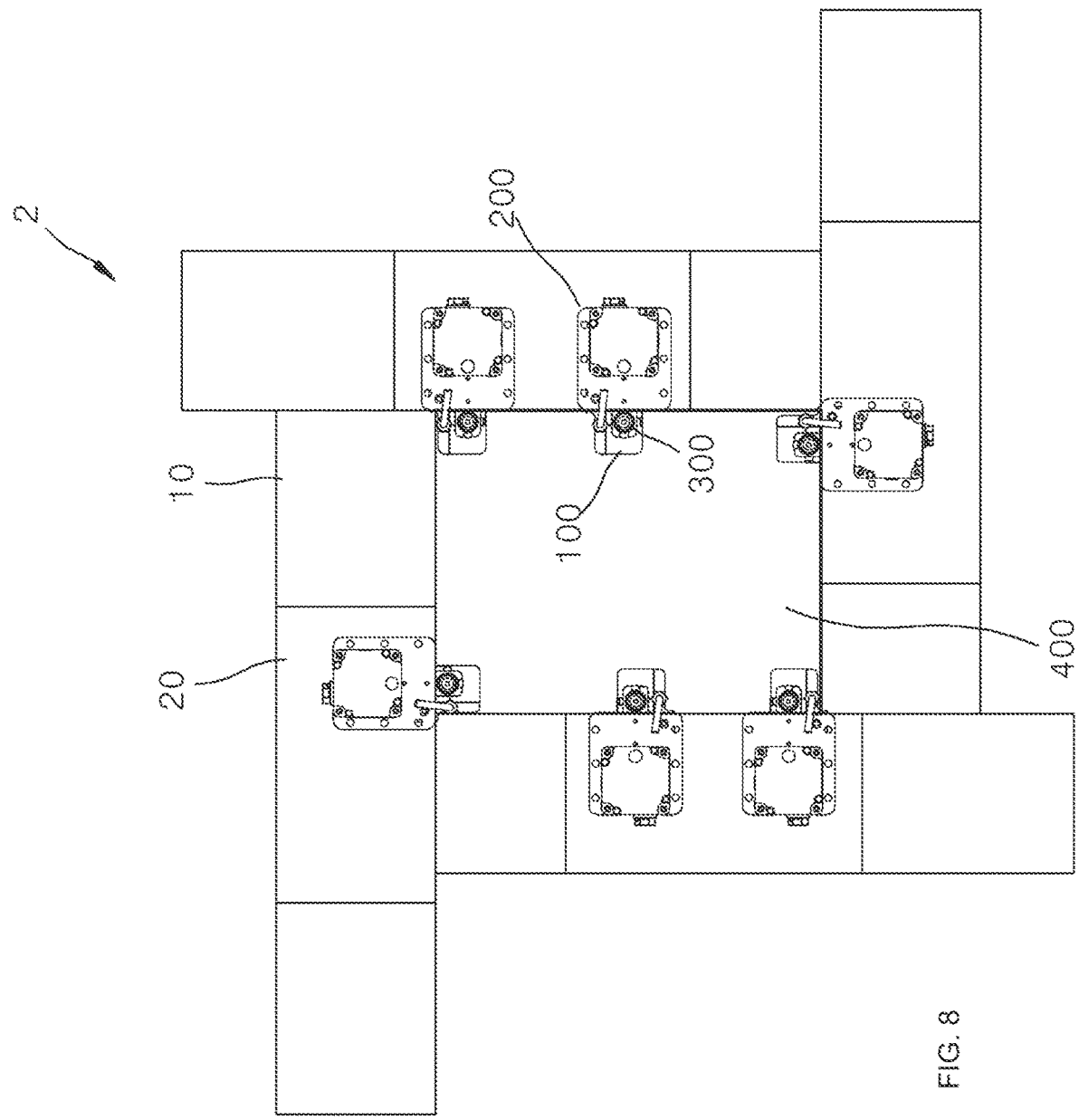
FIG. 8 is a view showing an overall configuration of a fast ultrasonic scanning apparatus with a circulating medium according to another embodiment of the present disclosure.

Specifically, like in a fast ultrasonic scanning apparatus 2 shown in FIG. 8, in the fast ultrasonic scanning apparatus 1 capable of obtaining an ultrasonic image while continuously supplying the ultrasonic medium using the ultrasonic medium supplying jig 100, it is not necessary to submerge the overall to-be-scanned object 400 in water in a case of scanning only part of a to-be-scanned object 400, specifically edge portions of ends of the object 400, and thus the fast ultrasonic scanning apparatus 1 is more effective. In addition, like in the fast ultrasonic scanning apparatus 2 shown in FIG. 8, ultrasonic scanning may be efficiently performed on a single large area of the to-be-scanned object 400 using a plurality of ultrasonic probes 300 even without entirely submerging the to-be-scanned object 400 in water.

A variety of contact media enabling an ultrasonic image to be obtained may be used as the ultrasonic medium according to the present disclosure. However, the following description will focus on a case in which water is used as a contact medium.

The fast ultrasonic scanning apparatus converts a rotating motion of a motor into a linear translating motion at an end of an ultrasonic probe including an ultrasonic transducer, and simultaneously moves the ultrasonic probe in a direction perpendicular to the linear translating motion, thereby achieving fast area scanning of a specific area of the to-be-scanned object.

To this end, the fast ultrasonic scanning apparatus converts the rotating motion of a driving motor into the linear translating motion of a connection rod by a linear guide using an eccentric rotator, and moves the ultrasonic probe at a constant speed in a direction perpendicular to the longitudinal direction of the ultrasonic probe, for example, perpendicular to the linear translation motion.

Referring to FIGS. 1 to 4, the fast ultrasonic scanning apparatus 1 according to an embodiment may include a support die 410, the ultrasonic probe 300, and the medium supplying jig 100. Here, the support die 410 has the to-be-scanned object 400 placed thereon, supports the to-be-scanned object 400, and the ultrasonic probe 300 receives an ultrasonic image while performing a linear translating motion in one direction. Here, the fast ultrasonic scanning apparatus 1 receives the ultrasonic image while performing a linear translating motion and simultaneously moving the ultrasonic probe 300 in a direction different from the direction in which the ultrasonic probe 300 performs a linear translating motion, thereby achieving fast area scanning of a specific area of the to-be-scanned object.

Here, the ultrasonic probe 300 may receive the ultrasonic image while the medium supplying jig 100 is transferred in a different direction from the longitudinal direction of the ultrasonic probe (e.g., the z-axis direction) and the direction (e.g., the y-axis direction) in which the ultrasonic probe performs a translating motion, for example, in a direction (e.g., the x-axis direction) perpendicular to both of the z-axis direction and the y-axis direction.

The fast ultrasonic scanning apparatus 1 continuously supplies an ultrasonic medium, for example, water, between the ultrasonic probe 300 and the to-be-scanned object 400 using the ultrasonic medium supplying jig 100, thereby obtaining a stable ultrasonic image while achieving fast scanning by preventing the to-be-scanned object from being submerged in the ultrasonic medium.

To this end, the fast ultrasonic scanning apparatus 1 may further include a medium tank 420, a support rod 310, a medium supply nipple 320, and a medium input line 330.

The support rod 310 may support the medium supplying jig 100. One end of the support rod 310 is supported by a base plate 210 of a driving unit 200, and the other end thereof is fastened to the medium supplying jig 100. Therefore, the medium supplying jig 100 is fixed on the driving unit 200 through the support rod 310. Here, the support rod 310 is formed to have a cylindrical shape, and has one end thereof fastened to a hole formed in the base plate 210 and the other end thereof fastened to a support 190 formed in the medium supplying jig 100.

The medium input line 330 is a line through which a medium is input and supplied, and may receive water supplied from a separate water tank through a pump, etc. by being connected to the separate water tank. The medium supply nipple 320 is coupled to a medium inlet port 120 of the medium supplying jig 100 and allow the ultrasonic medium input through the medium input line 330 to be injected into a medium supply line 150 of the medium supplying jig 100.

The medium tank 420 may receive the support die 410 therein and thus may store the ultrasonic medium introduced from the ultrasonic medium supplying jig 100. The medium is continuously supplied through the medium input line 330. That is, the supplied medium is continuously supplied to between the ultrasonic probe 300 and the to-be-scanned object 400 through the medium supply line 150 formed inside or outside the medium supplying jig 100 through the medium inlet port 120 of the medium supplying jig 100. The ultrasonic probe 300 may receive the ultrasonic image in the above-described medium supplying environment. The ultrasonic medium continuously supplied to between the ultrasonic probe 300 and the to-be-scanned object 400 is discharged from the medium supplying jig 100, and the medium discharged from the medium supplying jig 100 may be stored in the medium tank 420. Therefore, since the medium tank 420 stores the medium discharged from the medium supplying jig 100, the medium may be continuously supplied to the medium supplying jig 100. Here, the medium tank 420 may have a size and a height enough to store a sufficient amount of water. In addition, the support die 410 has a predetermined height and may be received in the medium tank 420. Since the support die 410 has a sufficient height, it is possible to prevent the to-be-scanned object 400 from being completely submerged in water.

A height of water stored in the medium tank 420 may be controlled not to be larger than that of the support die 410 so as to prevent the to-be-scanned object 400 from being completely submerged in water. To this end, a separate medium discharge unit for discharging the water stored in the medium tank 420 to the outside may be provided. A pump (not shown) having a medium discharge unit separately provided therein may be commonly used.

Meanwhile, the ultrasonic medium stored in the medium tank 420 may be injected into the medium inlet port 120 to be circulated. Here, for achieving area scanning, the medium supplying jig 100 performs a continuous motion in a direction perpendicular to the direction of the linear translating motion while receiving the ultrasonic probe 300 performing the linear translating motion at a high speed. Therefore, the medium supplying jig 100 continuously performs a linear motion with respect to the medium tank 420.

In addition, the fast ultrasonic scanning apparatus 1 of the present disclosure may further include a unit for stably discharging water while one end of the medium discharge unit moves in water.

Meanwhile, in order to allow the ultrasonic probe 300 to obtain an ultrasonic image of the to-be-scanned object 400, a structure capable of directly transferring ultrasonic waves from the sensing surface of the ultrasonic probe 300 to a scanning target portion of the to-be-scanned object 400 is required. In addition, in order to continuously supply the ultrasonic medium to between the ultrasonic probe 300 and the to-be-scanned object 400 in a state in which the medium supplying jig 100 is positioned between the ultrasonic probe 300 and the to-be-scanned object 400, the ultrasonic probe 300 and the to-be-scanned object 400 need to communicate with each other.

Therefore, some portions of the medium supplied to the medium supplying jig 100 are supplied from the medium supplying jig 100 to the ultrasonic probe 300, and some other portions are supplied toward the to-be-scanned object 400. To this end, a medium may be continuously supplied through a passage provided inside the medium supplying jig 100, for example, the medium supply line 150. In addition, a first medium outlet port 130 may be formed in a direction from one end of the medium supply line 150 toward the ultrasonic probe 300, and a second medium outlet 140 may be formed in a direction from the one end of the medium supply line 150 toward the to-be-scanned object 400. In addition, the first medium outlet port 130 and the second medium outlet 140 may communicate with each other to form a passage through which the ultrasonic image of the to-be-scanned object 400 is obtained from the ultrasonic probe 300.

Since the ultrasonic probe 300 performs a translating motion with respect to the medium supplying jig 100, a gap having a predetermined distance may be formed between the first medium outlet port 130 and a lower surface of the ultrasonic probe 300 so as to enable relative movement. The gap having a predetermined distance may be a gap formed between an upper contact surface 170 and the lower surface of the ultrasonic probe 300 to form the first medium outlet port 130 inside the receiving part 111 of the main body 110.

Figure 7:
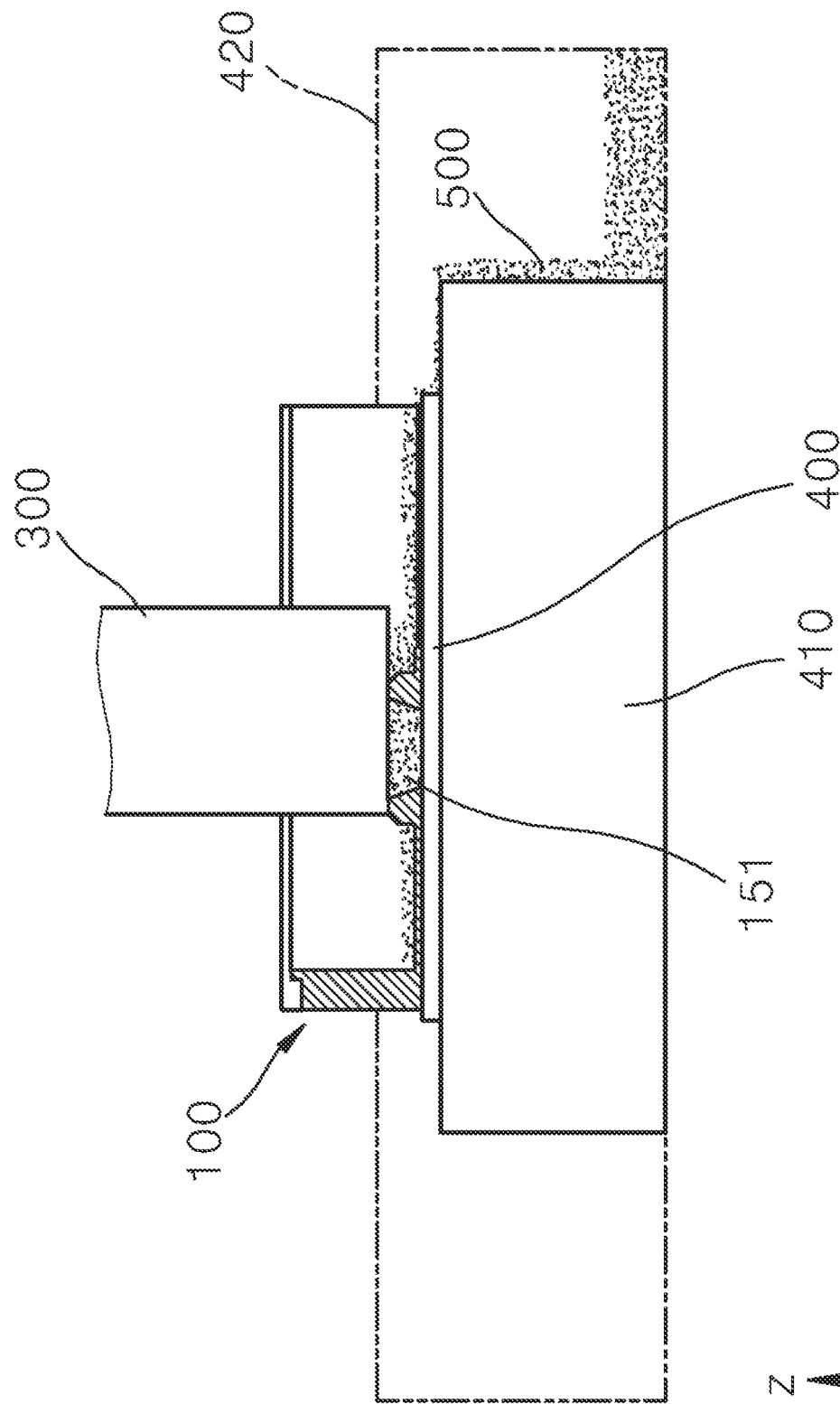
FIG. 7 schematically illustrates the flow of the ultrasonic medium shown in FIG. 1.

In this case, as shown in FIG. 7, the medium flowing out from the gap may be primarily received in the receiving part 111 of the medium supplying jig 100. In addition, the medium flowing out from the gap, which has been primarily received in the receiving part 111, may be stored in the medium tank 420 through the third medium outlet port 160, the to-be-scanned object 400 and/or the support die 410.

In addition, since the medium supplying jig 100 performs a continuous linear motion with respect to the to-be-scanned object 400, a gap having a predetermined distance may be formed between the to-be-scanned object 400 and the medium supplying jig 100 so as to enable relative movement. In this case, as shown in FIG. 7, the medium flowing out from the gap may be stored in the medium tank 420 through the to-be-scanned object 400 and/or the support die 410. Here, the gap having a predetermined distance may be a gap formed between the to-be-scanned object 400 and the lower contact surface 180 of the medium supplying jig 100 with a predetermined distance.

In the fast ultrasonic scanning apparatus 1, for fast area scanning, the ultrasonic probe 300 performs a fast translating motion in one direction, for example, in the y-axis direction, within the receiving part 111 of the medium supplying jig 100, and the medium supplying jig 100 performs a continuous linear motion in a direction perpendicular to the translating motion, for example, in the x-axis direction.

Figure 5:
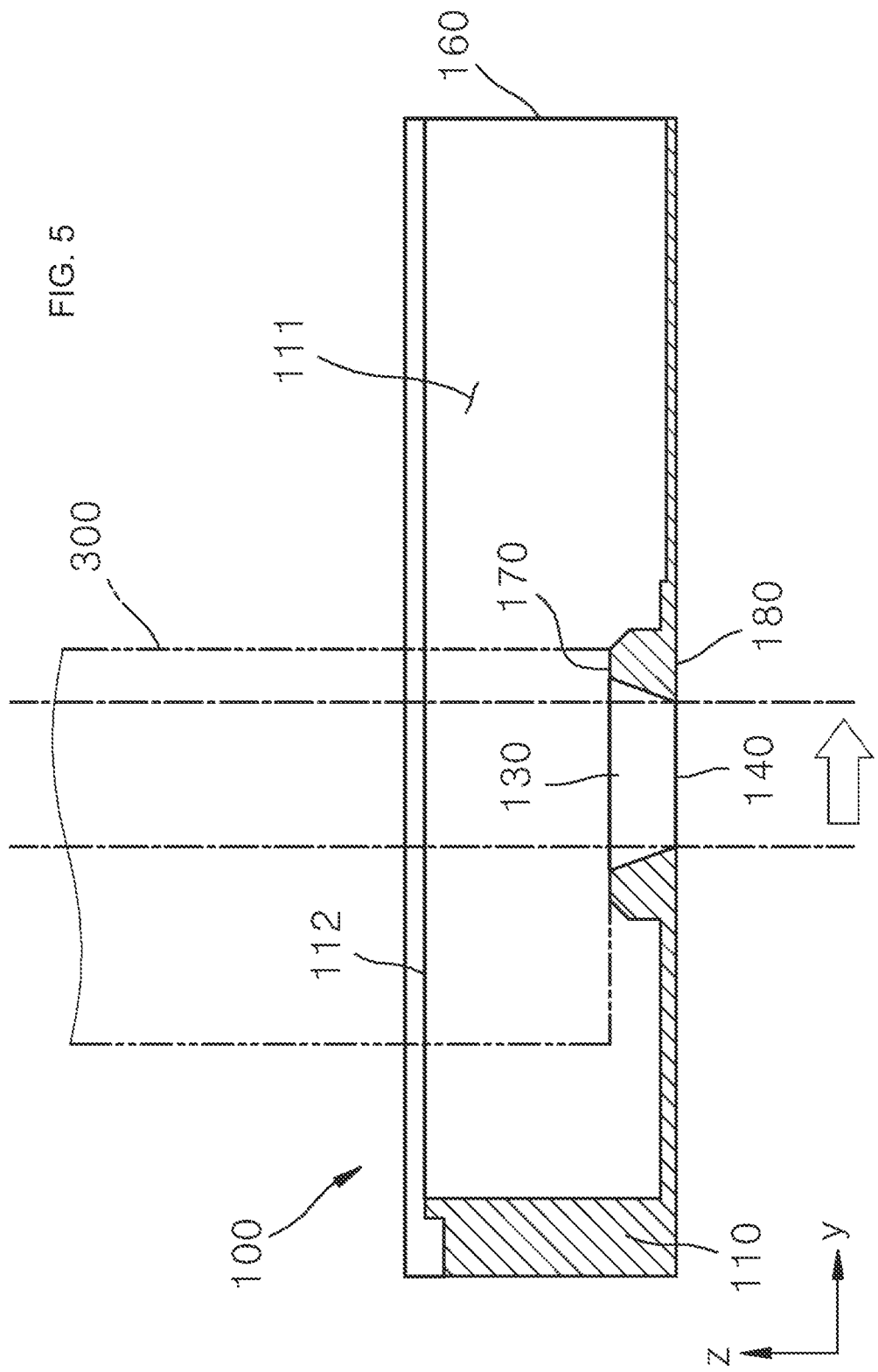
FIGS. 5 and 6 are views schematically illustrating positions of the ultrasonic probe at opposite ends of the translating motion when the ultrasonic probe performs a translating motion in the medium supplying jig of FIG. 4.
Figure 6:
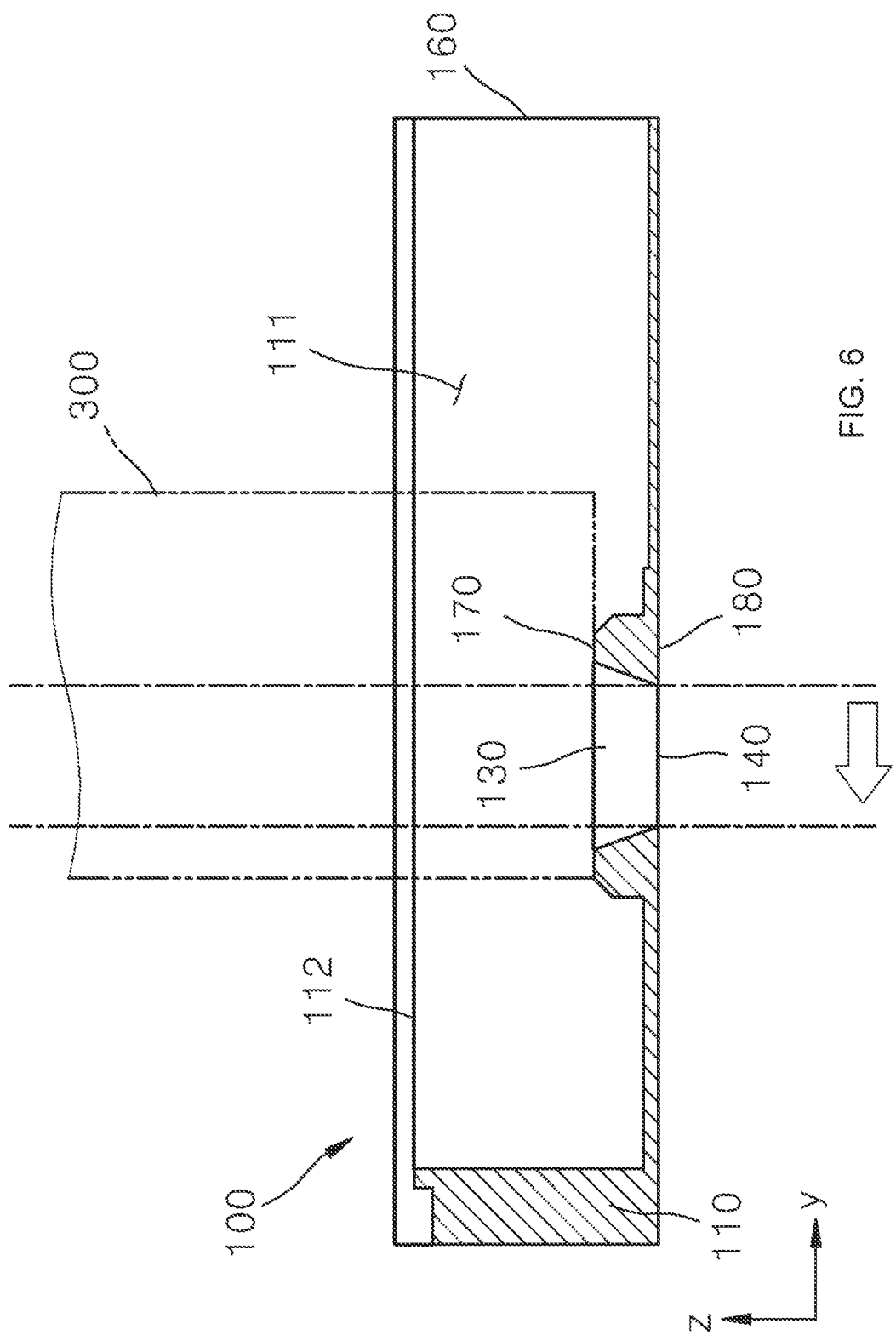

In this case, opposite ends of the translating motion of the ultrasonic probe 300 are positioned as shown in FIGS. 5 and 6. To this end, a hole opened in the y-axis direction is formed in the medium supplying jig 100, and a length of the hole in the y-axis direction length may be a range in which an ultrasonic image can be obtained. Here, the medium is supplied to the ultrasonic probe 300 through the first medium outlet port 130. In order to continuously and stably supply the medium, a surface of the first medium outlet port 130, facing the ultrasonic probe 300, may be covered by the sensing surface of the ultrasonic probe 300.

In addition, in order to continuously and stably supply the medium, a surface of the second medium outlet port 140, facing the to-be-scanned object 400, may be covered by the to-be-scanned object 400.

Referring to FIGS. 2 to 4, the ultrasonic medium supplying jig 100 may include a main body 110, a medium inlet port 120, a first medium outlet port 130, a second medium outlet port 140, and a medium supply line 150.

The main body 110 has a space provided to open at least one surface of the main body 110, and thus the receiving part 111 having one end including a sensing surface of the ultrasonic probe is formed therein. The medium inlet port 120 may be provided at one side of the main body 110 to inject the ultrasonic medium.

The first medium outlet port 130 may be provided in the main body 110 to supply an ultrasonic medium to a position where the sensing surface of the ultrasonic probe 300 is disposed. The second medium outlet port 140 may be in communication with the medium supply line 150 and may be formed toward the outside of the main body 110 while passing through a bottom surface of the main body 110 from the first medium outlet port 130. The medium supply line 150 may be provided to transfer the ultrasonic medium by connecting the medium inlet port 120 with the first medium outlet port 130.

The ultrasonic medium supplying jig 100 has a space provided between the ultrasonic probe 300 and the to-be-scanned object 400 by means of the first medium outlet port 130 and the second medium outlet port 140, and continuously supplies an ultrasonic medium to the space to fill the space between the ultrasonic probe 300 and the to-be-scanned object 400, thereby obtaining an ultrasonic image of a specific area of the to-be-scanned object 400.

To this end, the ultrasonic medium may be continuously supplied to the first medium outlet port 130 and the second medium outlet port 140 through the medium inlet port 120 and the medium supply line 150, so that the space between the ultrasonic probe 300 and the to-be-scanned object 400 is always filled with the ultrasonic medium while performing ultrasonic scanning. Here, the supplied medium may fill the space between first medium outlet port 130 and the second medium outlet port 140, connected to the medium supply line 150, which is closed by the ultrasonic probe 300 and the to-be-scanned object 400 to prevent water input thereto from being freely discharged, so that the ultrasonic probe 300 may receive the ultrasonic image of the to-be-scanned object 400.

Here, the medium is supplied to the ultrasonic probe 300 through the first medium outlet port 130, and the surface of the first medium outlet port 130, facing the ultrasonic probe 300, may be covered by the sensing surface of the ultrasonic probe 300, so as to allow the medium to be continuously supplied. In addition, in order to allow the medium to be continuously supplied, the surface of the second medium outlet port 140, facing the to-be-scanned object 400, may be covered by the to-be-scanned object 400.

However, since the ultrasonic probe 300 performs a translating motion with respect to the medium supplying jig 100, a gap having a predetermined distance may be formed between the first medium outlet port 130 and the lower surface of the ultrasonic probe 300 so as to enable relative movement. Here, the gap having a predetermined distance may be a gap formed between the upper contact surface 170 and the lower surface of the ultrasonic probe 300 to form the first medium outlet port 130 inside the receiving part 111 of the main body 110.

In this case, as shown in FIG. 7, the medium flowing out from the gap may be primarily received in the receiving part 111 of the medium supplying jig 100. In addition, the medium flowing out from the gap, which has been primarily received in the receiving part 111, may be stored in the medium tank 420 through the third medium outlet port 160, the to-be-scanned object 400 and/or the support die 410.

In addition, since the medium supplying jig 100 performs a continuous linear motion with respect to the to-be-scanned object 400, a gap having a predetermined distance may be formed between the to-be-scanned object 400 and the medium supplying jig 100 so as to enable relative movement. Here, the gap having a predetermined distance may be a gap formed between the to-be-scanned object 400 and the lower contact surface 180 of the medium supplying jig 100 with a predetermined distance.

In this case, as shown in FIG. 7, the medium flowing out from the gap may be stored in the medium tank 420 through the to-be-scanned object 400 and/or the support die 410.

Meanwhile, the receiving part 111 may have a space provided therein to allow the ultrasonic probe 300 to perform a translating motion in a direction (e.g., in the y-axis direction) different from the longitudinal direction of the ultrasonic probe (e.g., the z-axis direction). That is, the receiving part 111 may be formed such that the planar shape thereof is longer in the y-axis direction.

The first medium outlet port 130 may communicate with the medium inlet port 120, and the medium supplied through the medium inlet port 120 may be supplied to the sensing surface of the ultrasonic probe 300 through the first medium outlet port 130. To this end, the first medium outlet port 130 may be formed in a direction in which the sensing surface of the ultrasonic probe 300 of the bottom surface of the main body 110 is arranged.

The medium input line 330 may be connected to the medium inlet port 120 through the medium supply nipple 320 to allow an ultrasonic medium to be externally applied to the medium inlet port 120. The medium inlet port 120 may be provided at one side of the main body 110 to inject the ultrasonic medium into the main body 110. The medium injection port 120 may be provided at one side of an upper surface of the main body 110 or at one side of a side surface of the main body 110.

Meanwhile, the medium supply line 150 may be provided in the form of a pipe to penetrate the inside of the main body 110. When the medium inlet port 120 is provided on the upper surface of the main body 110, the medium supply line 150 may include a vertical portion downwardly penetrating the main body 110 from the medium inlet port 120, and a horizontal portion horizontally penetrating the main body 110 from an end portion of the vertical portion to then be connected to the first medium outlet port 130 and the second medium outlet port 140 in the lower portion of the main body 110.

In another embodiment, a medium inlet port (not shown) may be provided at one side of a side surface of the main body 110. In this case, a medium supply line may include a horizontal portion penetrating main body 110 from the medium inlet to be connected to the first medium outlet port 130 and the second medium outlet port 140 in the lower portion of the main body 110.

In still another embodiment, in consideration of manufacturing convenience, a horizontal portion (not shown) of the medium supply line may be provided inside the receiving part 111 of the main body 110 in the form of a separate pipe.

Meanwhile, at least a portion of one surface of the receiving part 111 may be opened to provide a third medium outlet port 160 in the main body 110 to allow an ultrasonic medium to be discharged from the receiving part to the outside. The third medium outlet 160 may be formed such that the at least a portion of the ultrasonic probe 300 is opened in one of directions in which the ultrasonic probe 300 performs a translating motion in the receiving part. In this case, the water flowing out from a gap between the ultrasonic probe 300 and the first medium outlet port 130 may be easily discharged to the third outlet 160 by the translating motion of the ultrasonic probe 300.

The receiving part 111 may have a space, in which the ultrasonic probe 300 performs a translating motion in a different direction (e.g., the y-axis direction) from the longitudinal direction of the ultrasonic probe (e.g., the z-axis direction). To this end, the receiving part 111 may be formed such that the planar shape thereof is longer in the y-axis direction. That is, each of the first medium outlet port 130 and the second medium outlet port 130 may be shaped of a slot in which a length thereof is larger in the direction (the y-axis direction) in which the ultrasonic probe 300 performs a translating motion than in the direction (the x-axis direction) perpendicular to the translating motion.

Meanwhile, an area of a surface of the first medium outlet port 130, facing the ultrasonic probe 300, may be larger than that of the second medium outlet port 140, facing the ultrasonic probe 300. In this case, a cross-section of a space between the first medium outlet port 130 and the second medium outlet port 140 may be shaped of a trapezoid having an upper side longer than a bottom side.

This is for allowing an ultrasonic medium to be stably filled in the space between the first medium outlet port 130 and the second medium outlet port 140 by compensating for a gravitational difference.

Meanwhile, cross-sectional areas of the medium inlet port 120 and the medium supply line 150 are preferably smaller than those of the first medium outlet port 130 and the second medium outlet port 140, respectively. This is for allowing an ultrasonic medium to be stably filled in the space between the first medium outlet port 130 and the second medium outlet port 140 by maintaining pressures of the medium inlet port 120 and the medium supply line 150 to be smaller than the pressure of the space between the first medium outlet port 130 and the second medium outlet port 140.

FIG. 8 is a view showing an overall configuration of a fast ultrasonic scanning apparatus with a circulating medium 2 according to another embodiment of the present disclosure.

Referring to FIG. 8, the fast ultrasonic scanning apparatus 2 may simultaneously scan edge portions of a to-be-scanned object 400 by using a plurality of ultrasonic probes 300. To this end, the fast ultrasonic scanning device 2 may include a support frame 10, a mounting plate 20, a driving unit 200, a medium supplying jig 100, and ultrasonic probes 300.

While, in FIG. 1, the to-be-scanned object 400 is supported by the support die 410, which is received in the water tank 420, the support die 410 and the water tank 420 are not visible, in FIG. 8, because they are covered by the support frame 10 and the to-be-scanned object 400.

The mounting plate 20 is slidably installed in each of the support frames 10 to linearly move along the support frame 10. The driving unit 200 may be installed on the mounting plate 20. Here, the four support frames 10 form an inner space having a quadrangular plane, and the to-be-scanned object 400 having a quadrangular planar shape is received therein, thereby obtaining an ultrasonic image of a circuit pattern formed on edge portions of each side of the to-be-scanned object 400, for example, on each side of a display panel.

Here, the four-sided space formed by the four support frames 10 may have long sides and short sides, and a larger number of driving units 200 may be installed in the long side support frame 10. Each of the driving units 200 may be installed on a separate mounting plate 20, and a plurality of driving units 200 may be installed on one mounting plate 20, as shown in FIG. 8.

The driving unit 200, installed on the mounting plate 20, may move toward the sides of the to-be-scanned object 400. The ultrasonic probe 300 has the ultrasonic probes 300 each having the medium supplying jig 100 installed therein to make the ultrasonic probes 300 perform a translating motion in a direction perpendicular to the sides of the to-be-scanned object 400. In this case, the medium supplying jig 100 moves while linearly moving together in the direction in which the mounting plate 20 moves.

That is, the driving unit 200 drives the ultrasonic probes 300 installed in the medium supplying jig 100 to perform a translating motion inside the medium supplying jig 100 in a direction perpendicular to the direction in which the mounting plate 20 moves.

Accordingly, the ultrasonic probes 300 may perform area scanning on edge portions of the to-be-scanned object 400 along the sides thereof by the translating motion and the linear motion in a direction perpendicular to the translating motion.

Specifically, the fast ultrasonic scanning device 2 which obtains an ultrasonic image while continuously supplying an ultrasonic medium using the ultrasonic medium supplying jig 100 may be more effectively used because the to-be-scanned object 400 is not necessarily submerged in water when only some portions of the to-be-scanned object 400, specifically edge portions of ends thereof, are scanned, like in the fast ultrasonic scanning device 2 shown in the drawing. In addition, ultrasonic scanning may be efficiently performed on one large-area object 400 to be scanned by using the plurality of ultrasonic probes 300 without entirely submerging the to-be-scanned object 400 in water.

Here, the to-be-scanned object 400 has a rectangular planar shape, the ultrasonic probes 300 are arranged on the respective sides of the to-be-scanned object 400, and the respective ultrasonic probes 30 may be controlled to simultaneously scan edge portions while simultaneously being transferred along the respective sides of the to-be-scanned object 400. At this time, the driving unit 200 and the mounting plate 20 may be controlled to simultaneously start and terminate their motions. In such a case, a larger number of ultrasonic probes 300 may be arranged on longer sides than on shorter sides of the to-be-scanned object 400.

In this case, the respective ultrasonic probes 30 may be set to scan different areas of the to-be-scanned object 400, and the ultrasonic probe 30 having the smallest scan area may perform scanning at the lowest speed. As the scanning speed is low, the accuracy of the scanning image is increased, and thus a more accurate image may be obtained.

Figure 9:
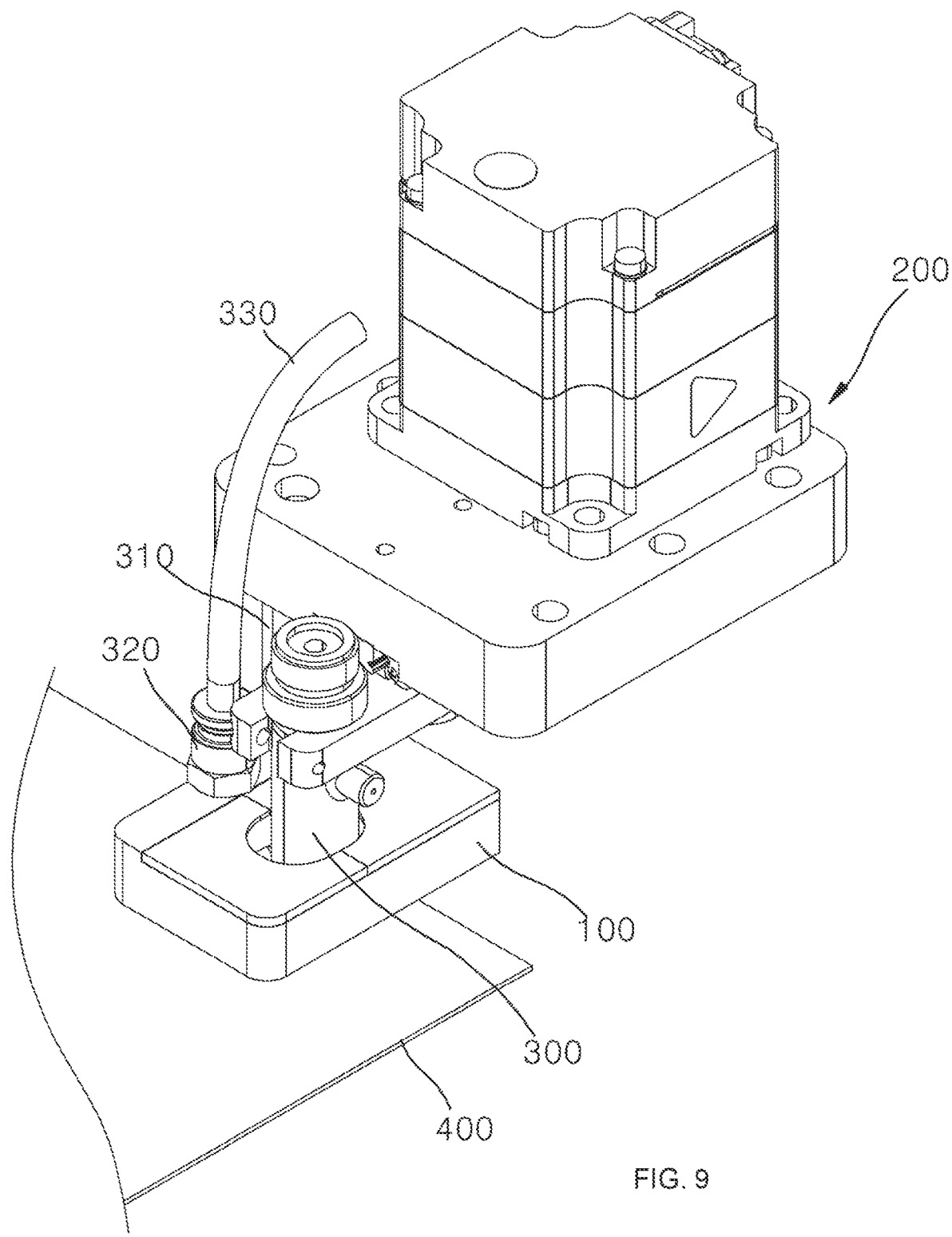
FIG. 9 is a diagram illustrating an embodiment of a driving unit for moving a probe in the fast ultrasonic scanning apparatus of FIG. 8.
Figure 10:
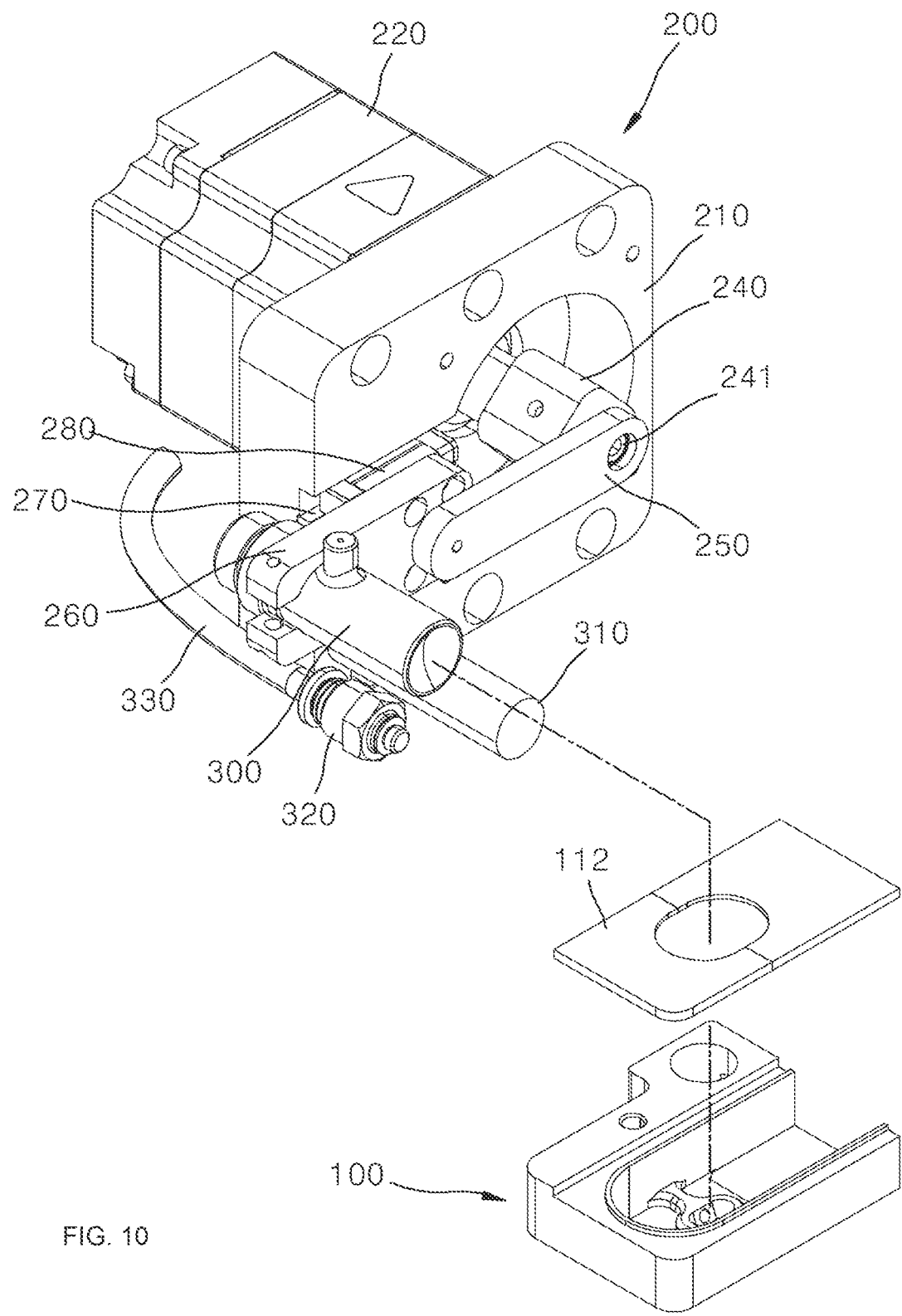
FIG. 10 is a partly exploded perspective view illustrating some components of the driving unit of FIG. 9.

FIGS. 9 and 10 illustrate an embodiment of a driving unit for moving a probe in the fast ultrasonic scanning apparatus of FIG. 8.

Referring to FIGS. 9 and 10, the driving unit may include a base plate 210, a driving motor 220, a rotating body 240, a moving rod 260, and an ultrasonic probe 300. The base plate 210 is installed on the upper surface of the mounting plate 20. The driving motor 220 is fixedly coupled to an upper surface portion of the base plate 210 and has a motor shaft penetrating the base plate 210 to protrude to a front portion of the base plate 210. The rotating body 240, which is connected to the motor shaft of the driving motor 220, rotates at the front portion of the base plate 210. The moving rod 260, which is connected to the rotating body 240 and the rotating body 240 by means of a connection rod 250, linearly moves at a bottom surface portion of the base plate 210. The ultrasonic probe 300 performs ultrasonic scanning on the to-be-scanning object while being fixedly coupled to the moving rod 260 by means of a fixing jig 290.

In addition, a linear guide rail 270 may be fixedly installed on the bottom surface of the base plate 210. In addition, a slider 280 may be installed on the linear guide rail 270 to linearly move along the linear guide rail 270. In addition, the moving rod 260, which is fixedly installed on the slider 280, performs a linear motion along with the slider 280. Here, the ultrasonic probe 300, fixedly installed on the moving rod 260, performs a linear motion together with the linear motion of the moving rod 260.

The rotating body 240 has one side installed on a driving shaft of the driving motor 220 to then perform a rotating motion with the rotating motion of the driving shaft of the driving motor 220. Here, an eccentric shaft 241 may be provided at the other side of the rotating body 240 so as to be spaced a predetermined distance part from the rotation center of the rotating body 240, one end of the connection rod 250 may be rotatably fastened to the eccentric shaft 241, and the other end of the connection rod 250 may be rotatably fastened to the moving rod 260.

In this case, the rotating motion of the driving shaft of the driving motor 220 is converted into a linear reciprocating motion (translating motion) of the moving rod 260 fixedly installed on the slider 280 constrained by the linear guide rail 270 so as to perform a linear motion. Accordingly, the rotation of the driving motor 220 may be converted into the linear translating motion of the ultrasonic probe 300.

Here, one end of the connecting rod 250 connected to the rotating body 240 rotates together with the rotating body 240, and the other end of the connection rod 250 connected to the driving rod 260 performs linear reciprocating motion. At this time, the linearly reciprocating connection rod 250 is linearly moved by a rotation diameter formed by the eccentric shaft 241.

The driving rod 260 may be provided in the form of a rectangular plate, and a connection hole, to which the connecting rod 250 is coupled through a bearing, may be provided at the center thereof. Accordingly, the driving rod 260 may be connected to the connecting rod 250 in a state in which it is rotatable relative to the connecting rod 250, so that it linearly moves along the linear guide rail 270 together with the connecting rod 250, when the connecting rod 250 performs a linear motion. Here, the driving rod 260 may be fixedly coupled to the slider 280 coupled to the linear guide rail 270 and may be moved with the slider 280 as a single body.

In addition, the driving rod 260 may be coupled to the outer surface of the slider 280 and performs a linear motion along the linear guide rail 270, together with the slider 280, and a stroke of the linearly moving driving rod 260 may be linearly moved by the rotation diameter formed by the eccentric shaft 241.

Therefore, since the driving rod 260 having the stroke corresponding to the rotation diameter of the eccentric shaft 241, as described above, is shorter than a distance of the linear reciprocating motion, a relatively weak vibration may occur even when the rotating body 240 rotates at a high speed, thereby minimizing vibrations of the ultrasonic probe without providing a separate counter balance 180. However, within the scope of the present embodiment, vibration can be further reduced by using a counter balance.

Meanwhile, a cover 112 may be provided in the medium supplying jig 100. The cover 112 may prevent water splashing, which may occur when the ultrasonic probe 300 performs a translating motion.

While the present disclosure has been described with reference to one or more exemplary embodiments, the embodiments described herein have been presented by way of example only, and it will be apparent to those skilled in the art that various modifications and improvements may be made within the inventive concept. All of simple modifications or changes of the present disclosure are included within the scope of the disclosure and the specific protection scope of the present disclosure will be defined by the appended claims.

What is claimed is:

1. A jig for supplying an ultrasonic medium, the medium supplying jig comprising:
   a main body having a space provided to open at least one surface thereof to form a receiving part in which one end including a sensing surface of an ultrasonic probe is received;
   a medium inlet port through which the ultrasonic medium is injected;
   a first medium outlet port provided at a position of the main body, where a sensing surface of the ultrasonic probe is disposed, to supply the ultrasonic medium;
   a medium supply line provided to transfer the ultrasonic medium by connecting the medium inlet port with the first medium outlet port;
   a second medium outlet port being in communication with the medium supply line and formed on the outer surface of the main body while penetrating a bottom surface of the main body from the first medium outlet port; and
   a gap having a predetermined distance formed between the first medium outlet port and the ultrasonic probe to enable a horizontal translating motion of the ultrasonic probe,
   wherein the first medium outlet port is formed on the bottom surface of the inside of the main body so as to face the sensing surface of the ultrasonic probe, and a space is provided in the receiving part, so that the ultrasonic probe performs the horizontal translating motion on the first medium outlet port in a direction perpendicular to a longitudinal direction of the ultrasonic probe while being in contact with the first medium outlet port by means of the ultrasonic medium; and
   wherein the gap allows the ultrasonic medium to flow out from a channel formed between the first medium outlet port and the second medium outlet port during the horizontal translating motion of the ultrasonic probe.

2. The medium supplying jig of claim 1, wherein the medium inlet port is provided at one side of the main body, and the medium supply line is provided inside the main body.

3. The medium supplying jig of claim 1, further comprising a third medium outlet port through which the ultrasonic medium stored in the receiving part is discharged as at least a portion of one surface of the receiving part is opened.

4. The medium supplying jig of claim 3, wherein the third medium outlet port is formed such that the at least a portion thereof is opened in one of both directions in which the ultrasonic probe performs a translating motion in the receiving part.

5. The medium supplying jig of claim 1, wherein the first medium outlet port is shaped of a slot in which a length thereof is larger in the direction in which the ultrasonic probe performs a translating motion than in the direction perpendicular to the translating motion.

6. The medium supplying jig of claim 1, wherein the second medium outlet port is shaped of a slot in which a length thereof is larger in the direction in which the ultrasonic probe performs a translating motion than in the direction perpendicular to the translating motion.

7. The medium supplying jig of claim 1, wherein an area of a surface of the first medium outlet port, facing the ultrasonic probe is larger than that of a surface of the second medium outlet port, facing the ultrasonic probe.

8. The medium supplying jig of claim 1, wherein cross-sectional areas of the medium inlet port and the medium supply line are smaller than those of the first medium outlet port and the second medium outlet port, respectively.

9. A fast ultrasonic scanning apparatus with a circulating medium, the fast ultrasonic scanning apparatus comprising:
   a support die on which a to-be-scanned object is placed;
   the medium supplying jig according to claim 1, disposed on the to-be-scanned object;
   an ultrasonic probe which receives an ultrasonic image while performing a horizontal translating motion; and
   wherein the ultrasonic probe receives the ultrasonic image while the medium supplying jig is transferred in a different direction from a longitudinal direction of the ultrasonic probe and the direction in which the ultrasonic probe performs the horizontal translating motion.

10. The fast ultrasonic scanning apparatus of claim 9, wherein the ultrasonic medium supplying jig further comprises a third medium outlet port through which the ultrasonic medium in the receiving part is discharged from the receiving part as at least a portion of one surface of the receiving part is opened.

11. The fast ultrasonic scanning apparatus of claim 9, wherein the gap is positioned between the to-be-scanned object and the ultrasonic medium supplying jig.

12. The fast ultrasonic scanning apparatus of claim 9, wherein a surface of the first medium outlet port, facing the ultrasonic probe, is covered by a sensing surface of the ultrasonic probe at opposite ends of the translating motion of the ultrasonic probe.

13. The fast ultrasonic scanning apparatus of claim 9, further comprising a medium tank for receiving the support die and storing the ultrasonic medium introduced from the ultrasonic medium supplying jig.

14. The fast ultrasonic scanning apparatus of claim 13, wherein the ultrasonic medium stored in the medium tank is introduced to the medium inlet port and circulated.

15. A fast ultrasonic scanning system with a circulating medium, for controlling a plurality of the fast ultrasonic scanning apparatuses according to claim 9 to scan edge portions of a to-be-scanned object.

16. The fast ultrasonic scanning system of claim 15, wherein the to-be-scanned object has a quadrangular plane shape, the ultrasonic probes are arranged on each side of the to-be-scanned object and the respective ultrasonic probes are controlled to simultaneously scan the respective edge portions of the to-be-scanned object while being simultaneously transferred to the respective sides of the to-be-scanned object.

17. The fast ultrasonic scanning system of claim 16, wherein the respective ultrasonic probes simultaneously start scanning and simultaneously terminate scanning.

18. The fast ultrasonic scanning system of claim 15, wherein the to-be-scanned object has a rectangular plane shape, and more ultrasonic probes are arranged on longer sides than on the shorter sides of the to-be-scanned object.

\* \* \* \* \*